(12) United States Patent
Santillo et al.

(10) Patent No.: US 12,522,194 B2
(45) Date of Patent: Jan. 13, 2026

(54) SYSTEM AND METHOD FOR CALIBRATING STEERING ANGLE OFFSET USING INFRASTRUCTURE SENSORS

(71) Applicant: Ford Motor Company, Dearborn, MI (US)

(72) Inventors: Mario Anthony Santillo, Canton, MI (US); Meghna Menon, Ann Arbor, MI (US); Gregory P. Linkowski, Dearborn, MI (US); Krishna Bandi, Novi, MI (US)

(73) Assignee: Ford Motor Company, Dearborn, MI (US)

( * ) Notice: Subject to any disclaimer, the term of this patent is extended or adjusted under 35 U.S.C. 154(b) by 119 days.

(21) Appl. No.: 18/518,084

(22) Filed: Nov. 22, 2023

(65) Prior Publication Data

US 2024/0182016 A1    Jun. 6, 2024

Related U.S. Application Data

(60) Provisional application No. 63/430,505, filed on Dec. 6, 2022.

(51) Int. Cl.
| | |
|---|---|
| *B60W 10/20* | (2006.01) |
| *B60W 40/114* | (2012.01) |
| *B60W 50/00* | (2006.01) |
| *G06V 20/40* | (2022.01) |
| *G06V 20/52* | (2022.01) |
| *H04W 4/44* | (2018.01) |

(52) U.S. Cl.
CPC .......... *B60W 10/20* (2013.01); *B60W 40/114* (2013.01); *B60W 50/00* (2013.01); *G06V 20/40* (2022.01); *G06V 20/52* (2022.01); *H04W 4/44* (2018.02); *B60W 2050/0083* (2013.01); *B60W 2520/14* (2013.01); *B60W 2540/18* (2013.01); *B60W 2556/45* (2020.02); *G06V 2201/08* (2022.01)

(58) Field of Classification Search
CPC .... B60W 10/20; B60W 40/114; B60W 50/00; B60W 2050/0083; B60W 2520/14; B60W 2540/18; B60W 2556/45; G06V 20/40; G06V 20/52; G06V 2201/08; G06V 20/56; H04W 4/44; B62D 15/025; B62D 5/0457; B62D 15/0245; B62D 15/024
USPC .......................................................... 701/41
See application file for complete search history.

(56) References Cited

U.S. PATENT DOCUMENTS

| | | | |
|---|---|---|---|
| 2023/0099968 A1* | 3/2023 | Ramanathan | .......... G05D 1/104 700/259 |
| 2023/0145508 A1 | 5/2023 | Kaphengst et al. | |
| 2023/0322208 A1* | 10/2023 | Rojas | .................. B60W 50/085 701/41 |

* cited by examiner

*Primary Examiner* — Yi-Kai Wang
(74) *Attorney, Agent, or Firm* — Burris Law, PLLC (57) ABSTRACT

A method for the determination of pose information associated with a vehicle, the determination of a steering angle offset of the vehicle using an offset determination model configured to learn the steering angle offset of the vehicle, and the transmission of one or more steering angle offset commands to the vehicle.

20 Claims, 5 Drawing Sheets

SYSTEM AND METHOD FOR CALIBRATING STEERING ANGLE OFFSET USING INFRASTRUCTURE SENSORS

CROSS-REFERENCE TO RELATED APPLICATION

This application claims the benefit of and priority to U.S. Provisional Application No. 63/430,505, filed on Dec. 6, 2022, and titled "SYSTEM AND METHOD FOR CALIBRATING STEERING ANGLE OFFSET USING INFRASTRUCTURE SENSORS", the contents of which are incorporated herein by reference in its entirety.

FIELD

The present disclosure relates to the calibration of a steering angle offset of a vehicle. More specifically, the present disclosure relates to the calibration of a steering angle offset of a vehicle based on wireless communication between the vehicle and an infrastructure.

BACKGROUND

The statements in this section merely provide background information related to the present disclosure and may not constitute prior art.

Steer-by-wire vehicles can require vehicle-specific calibration of a steering system to provide reference knowledge of wheels of the vehicle pointing straight-forward so that the wheels are able to drive in the same direction as commanded. This knowledge is generally used for various automated steering features, such as fully active park assist, remote park assist, auto-hitch, trailer backup assist, autonomous vehicle marshalling, etc. Due to large steering-gear ratios, a small stack-up of errors, such as part variability and installation variances, can result in significant offsets from vehicle-to-vehicle. In some applications, offsets are expected to be within +/−45 degrees. Without learning the vehicle-specific offset, an automated steering system that commands the vehicle to point the wheels straight could result in wheel angles ranging anywhere from lock to lock in either direction.

Calibration processes currently used, such as performed with a dynamometer, by an extended calibration process, and/or by a wheel-alignment station, can be time consuming and inhibit the implementation of automated manufacturing systems. The present disclosure addresses these and other issues related to the calibration of a steering angle offset.

SUMMARY

This section provides a general summary of the disclosure and is not a comprehensive disclosure of its full scope or all of its features.

The present disclosure provides a method comprising: determining, by a sensing system, pose information associated with a vehicle of one or more vehicles; determining, by the sensing system, a steering offset of the vehicle using an offset determination model configured to learn the steering offset of the vehicle, wherein the determination of the steering offset is based on the pose information; and transmitting, by the sensing system, one or more steering offset commands to the vehicle, wherein the one or more steering offset commands include the learned steering offset, a desired angle, or a combination thereof; wherein the pose information includes an x-location, a y-location, a yaw angle, a velocity, or a combination thereof; wherein determining the steering offset of the vehicle further comprises: calculating an angular velocity of steering offset commands ($\dot{\theta}_{offset\ command}$) based on $\dot{\theta}_{command}^{offset}=k\times(\theta_{desired}-\theta_{observed})$ wherein the $\theta_{offset\ command}$ is calculated by multiplying a learning rate (k) by a difference of a desired steering angle ($\theta_{desired}$) and an observed steering angle ($\theta_{observed}$); wherein determining the pose information further comprises: obtaining, by one or more sensors associated with the sensing system, video data related to the pose information; further comprising: comparing one or more data points of the obtained video data with an expected set of data points; and re-obtaining the video data based on the comparison not satisfying a defined condition; wherein determining the steering offset is further based on the comparison satisfying the defined condition; and further comprising: determining one or more dynamic steering angle offsets associated with the vehicle based on data obtained at each location of a plurality of locations monitored by the sensing system; and transmitting an updated steering offset command to the vehicle, wherein the updated steering offset command is based on aggregating the one or more dynamic steering angle offsets and includes the aggregated steering angle offset, the desired angle, or a combination thereof.

The present disclosure provides a system comprising: a sensing system configured to: determine pose information associated with a vehicle of one or more vehicles, determine a steering offset of the vehicle using an offset determination model configured to learn the steering offset of the vehicle, wherein the determination of the steering offset is based on the pose information, and transmit one or more steering offset commands to the vehicle, wherein the one or more steering offset commands include the learned steering offset, a desired angle, or a combination thereof; and the vehicle configured to receive the one or more steering offset commands; wherein the pose information includes an x-location, a y-location, a yaw angle, a velocity, or a combination thereof; wherein the sensing system configured to determine the steering offset of the vehicle is further configured to: calculate an angular velocity of steering offset commands ($\dot{\theta}_{offset\ command}$) based on: $\dot{\theta}_{command}^{offset}=k\times(\gamma_{desired}-\theta_{observed})$ wherein the #offset command is calculated by multiplying a learning rate (k) by a difference of a desired steering angle ($\theta_{desired}$) and an observed steering angle ($\theta_{observed}$); wherein the sensing system configured to determine the pose information is further configured to: obtain, by one or more sensors associated with the sensing system, video data related to the pose information; wherein the sensing system is further configured to: compare one or more data points of the obtained video data with an expected set of data points; and re-obtain the video data based on the comparison not satisfying a defined condition; wherein determining the steering offset is further based on the comparison satisfying the defined condition; and wherein the sensing system is further configured to: determine one or more dynamic steering angle offsets associated with the vehicle based on data obtained at each location of a plurality of locations monitored by the sensing system; and transmit an updated steering offset command to the vehicle, wherein the updated steering offset command is based on aggregating the one or more dynamic steering angle offsets and includes the aggregated steering angle offset, the desired angle, or a combination thereof.

The present disclosure provides one or more non-transitory computer-readable media storing processor-executable instructions that, when executed by at least on processor, cause the at least one processor to: determine, by a sensing system, pose information associated with a vehicle of one or more vehicles, wherein the pose information includes an x-location, a y-location, a yaw angle, a velocity, or a combination thereof; determine, by the sensing system, a steering offset of the vehicle using an offset determination model configured to learn the steering offset of the vehicle, wherein the determination of the steering offset is based on the pose information; and transmit, by the sensing system, one or more steering offset commands to the vehicle, wherein the one or more steering offset commands include the learned steering offset, a desired angle, or a combination thereof; wherein the processor-executable instructions that, when executed by the at least one processor, cause the sensing system to determine the steering offset of the vehicle, further cause the at least one processor to: calculate an angular velocity of steering offset commands ($\dot{\theta}_{offset\ command}$) based on: $\dot{\theta}_{command}^{offset} = k \times (\theta_{desired} - \theta_{observed})$ wherein the $\dot{\theta}_{offset\ command}$ is calculated by multiplying a learning rate (k) by a difference of a desired steering angle ($\theta_{desired}$) and an observed steering angle ($\theta_{observed}$); wherein the processor-executable instructions that, when executed by the at least one processor, cause the sensing system to determine the pose information, further cause the at least one processor to: obtain, by one or more sensors associated with the sensing system, video data related to the pose information; wherein the at least one processor is further caused to: compare one or more data points of the obtained video data with an expected set of data points; and re-obtain the video data based on the comparison not satisfying a defined condition; wherein determining the steering offset is further based on the comparison satisfying the defined condition; and wherein the at least one processor is further caused to: determine one or more dynamic steering angle offsets associated with the vehicle based on data obtained at each location of a plurality of locations monitored by the sensing system; and transmit an updated steering offset command to the vehicle, wherein the updated steering offset command is based on aggregating the one or more dynamic steering angle offsets and includes the aggregated steering angle offset, the desired angle, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

One or more herein described examples provide a means for wirelessly adjusting the steering angle offset of one or more vehicles with the communication between any of the one or more vehicles and an infrastructure utilized to marshal the one or more vehicles to various waypoints. It is understood that the marshaling of the one or more vehicles, by the infrastructure, is automated. With the inclusion of automated vehicle marshaling into a manufacturing end-of-line process, the one or more vehicles automatically maneuver between one or more calibration stations without the aid of a human driver by using sensors mounted in a factory infrastructure. The sensors are used to provide real-time accurate vehicle localization along with wireless communication between the infrastructure and the one or more vehicles for a closed-loop control.

To be able to implement the automated marshaling system within the factory infrastructure, the automated vehicle marshaling requires automated steering to be enabled immediately at the end-of-line, after vehicle tires and wheels have been installed. Waiting for a steering-angle offset calibration procedure to be performed at a wheel-alignment workstation, that is downstream from the tire and wheel installation workstation, is not desirable in an automated marshaling system. Therefore, the steering-angle offset calibration processes, in one or more examples, is performed immediately at the end-of-line as is described herein.

Figure 1:
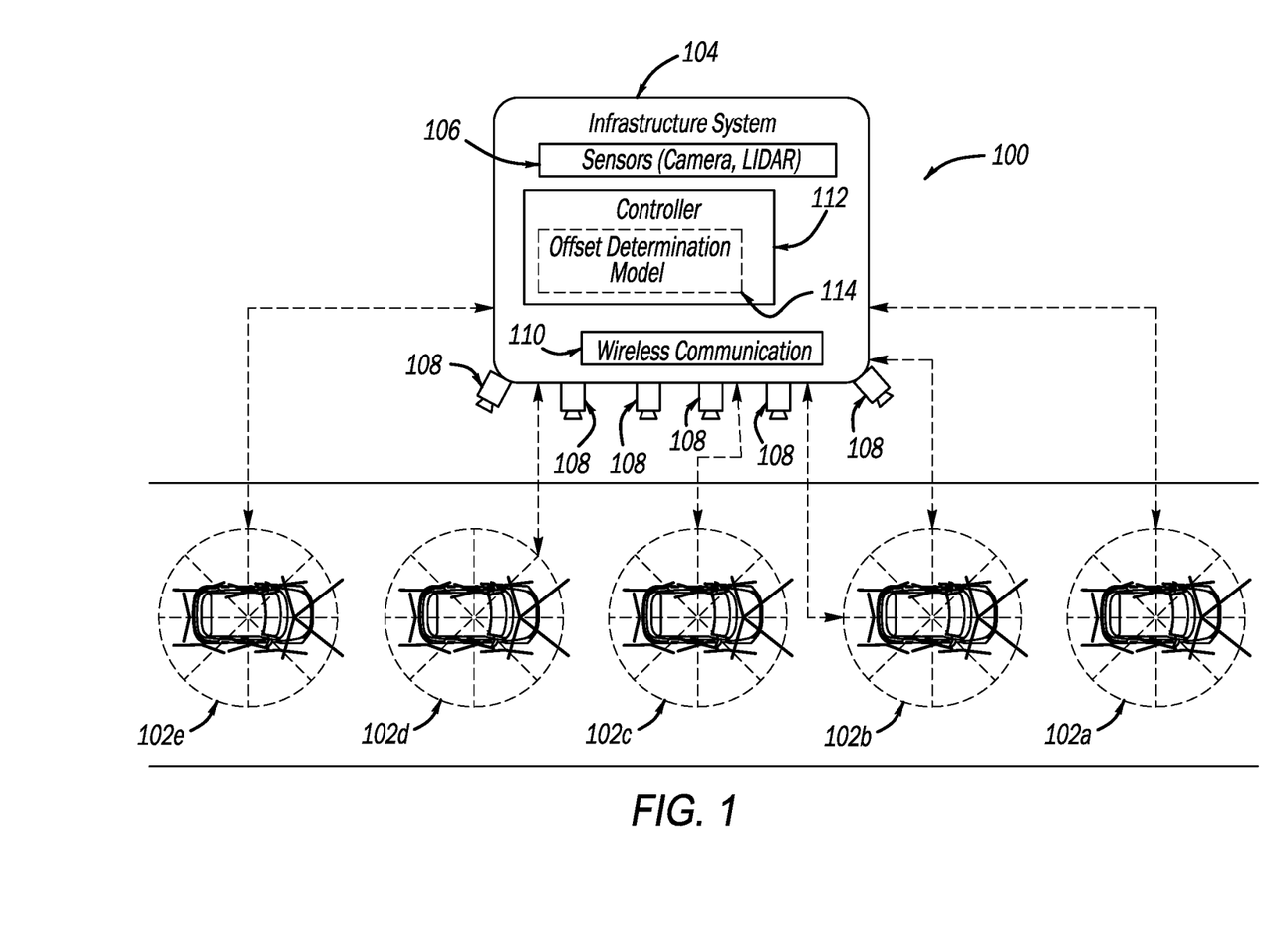
FIG. 1 illustrates a system for distribution of a fleet of vehicles in accordance with various implementations.

Referring now to FIG. 1, there is shown a system 100 (e.g., an automated vehicle marshaling (AVM) system) for the distribution of autonomous and semi-autonomous vehicles 102 (e.g., one or more vehicles 102a-102e) for example, situated in a factory floor. The system 100 includes an infrastructure system 104. The infrastructure system 104 further includes a sensor component 106 that communicates with a set of infrastructure sensors 108 such as, for example, one or more cameras, lidar, radar, and/or ultrasonic devices. The sensors 108 monitor the movement of the vehicles 102 as the vehicles 102 move through, for example, the factory floor. The infrastructure system 104 also includes a wireless communication component 110 that provides for communication between the infrastructure system 104 and the vehicles 102. Additionally, the infrastructure system 104 includes an infrastructure controller 112. The infrastructure controller 112 is configured to centrally control the operation of each of the vehicles 102. For example, the operation of each of the vehicles 102 includes propulsion, braking, and steering of the vehicles 102. It is understood that the infrastructure controller 112 may be disposed within the infrastructure system 104 or externally located relative to the infrastructure system 104. The infrastructure controller 112 includes an offset determination model 114 that is configured to facilitate the communication of the infrastructure controller 112 with a vehicle controller 200 associated with each of the vehicles 102.

Figure 2:
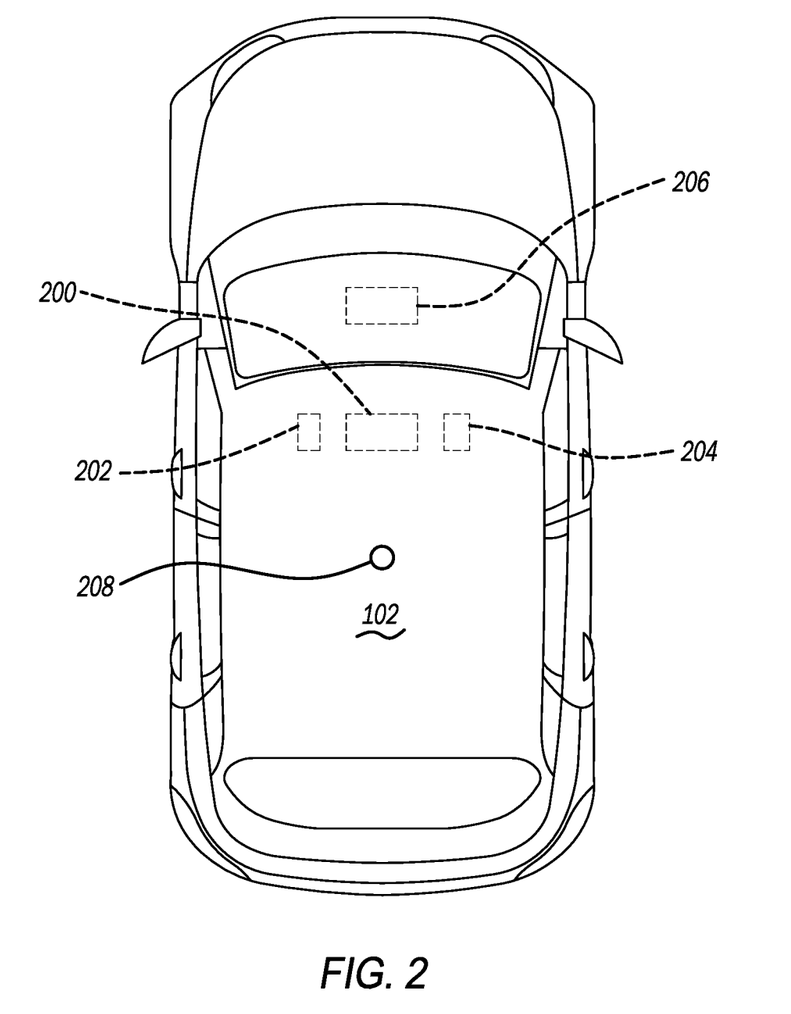
FIG. 2 illustrates an example vehicle distributed by the system shown in FIG. 1 in accordance with various implementations.

Referring further to FIG. 2, in various forms, the vehicles 102 may be powered in a variety of ways, for example, with an electric motor and/or an internal combustion engine. The vehicles 102 may be any type of vehicle powered by an electric motor and/or an internal combustion engine such as a car, a truck, a robot, a plane and/or a boat, as non-limiting examples. Each of the vehicles 102 include a vehicle controller 200, one or more actuators 202, a plurality of onboard sensors 204, and a human machine interface (HMI) 206. Each of the one or more vehicles 102a-102e also have a reference point 208, that is, a specified point within the space defined by a vehicle body, for example, a geometrical center point at which respective longitudinal and lateral center axes of a particular vehicle of the one or more vehicles 102a-102e intersect. The reference point 208 identifies the location of the particular vehicle of the one or more vehicles 102a-102e, for example, a point at which the vehicles 102 are located as the vehicles 102 navigate toward a waypoint.

The vehicle controller 200, in some examples, is configured or programmed to control the operation of the one or more vehicle 102a-102e brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the vehicle controller 200, as opposed to a human operator, is to control such operations. It is understood that any of the operations associated with the vehicles 102 may be facilitated via an automated, a semi-automated, or a manual mode. For example, the automated mode may facilitate for any of the operations to be fully controlled by the vehicle controller 200 without the aid of a user. As another example, the semi-automated mode may facilitate for any of the operations to be at least partially controlled by the vehicle controller 200 and/or the user. As a further example, the manual mode may facilitate for any of the operations to be fully controlled by the user.

The vehicle controller 200 includes or may be communicatively coupled to (e.g., via a vehicle communications bus) one or more processors, for example, controllers or the like included in the vehicles 102 for monitoring and/or controlling various vehicle controllers, such as a powertrain controller, a brake controller, a steering controller, etc. The vehicle controller 200 is generally arranged for communications on a vehicle communication network that can include a bus in the vehicle 102 such as a controller area network (CAN) or the like, and/or other wired and/or wireless mechanisms.

The vehicle controller 200 transmits messages, via a vehicle network, to various devices in the vehicles 102 and/or receives messages from the various devices, for example, the one or more actuators 202, the HMI 206, etc. Alternatively, or additionally, in cases where the vehicle controller 200 includes multiple devices, the vehicle communication network is utilized for communications between devices represented as the vehicle controller 200 in this disclosure. Further, as discussed below, various other controllers and/or sensors provide data to the vehicle controller 200 via the vehicle communication network.

In addition, the vehicle controller 200 is configured for communicating through a wireless vehicular communication interface with other traffic objects (for example, vehicles, infrastructures, pedestrians, etc.), such as, via a vehicle-to-vehicle communication network. The vehicle controller 200 is also configured for communicating through a vehicle-to-infrastructure communication network, such as communicating with the infrastructure controller 112 of the infrastructure system 104. The vehicular communication network represents one or more mechanisms by which the vehicle controller 200 of the vehicles 102 communicate with other traffic objects, and may be one or more of wireless communication mechanisms, including any desired combination of wireless (e.g., cellular, wireless, satellite, microwave, and radio frequency) communication mechanisms and any desired network topology (or topologies when multiple communication mechanisms are utilized). Examples of vehicular communication networks include, among others, cellular, Bluetooth®, IEEE 802.11, dedicated short range communications (DSRC), and/or wide area networks (WAN), including the Internet, providing data communication services.

The vehicle actuators 202 are implemented via circuits, chips, or other electronic and/or mechanical components that can actuate various vehicle subsystems in accordance with appropriate control signals. The actuators 202 may be used to control braking, acceleration, and/or steering of the vehicles 102. The vehicle controller 200 can be programmed to actuate the vehicle actuators 202 including propulsion, steering, and/or braking based on the planned acceleration or deceleration of the vehicles 102.

The sensors 204 include a variety of devices to provide data to the vehicle controller 200. For example, the sensors 204 may include object detection sensors such as lidar sensor(s) disposed on or in the vehicles 102 that provide relative locations, sizes, and shapes of one or more targets surrounding the vehicles 102, for example, additional vehicles, bicycles, pedestrians, robots, drones, etc., travelling next to, ahead, and/or behind the vehicles 102. As another example, one or more of the sensors can be radar sensors affixed to one or more bumpers of the vehicles 102 that may provide locations of the target(s) relative to the location of each of the vehicles 102.

The object detection sensors may include a camera sensor, for example, to provide a front view, side view, rear view, etc., providing images from an area surrounding the vehicles 102. For example, the vehicle controller 200 may be programmed to receive sensor data from a camera sensor(s) and to implement image processing techniques to detect a road, infrastructure elements, etc. The vehicle controller 200 may be further programmed to determine a current vehicle location based on location coordinates, for example, GPS coordinates, received from the vehicles 102 and indicative of a location of the vehicles' 102 location from a GPS sensor.

The HMI 206 is configured to receive information from a user, such as a human operator, during operation of the vehicles 102. Moreover, the HMI 206 is configured to present information to the user, such as, an occupant of one or more of the vehicles 102. In some variations, the vehicle controller 200 is programmed to receive destination data, for example, location coordinates, from the HMI 206.

Accordingly, the vehicles 102 can be autonomously guided toward a waypoint using a combination of the infrastructure sensors 108 and the vehicle sensors (e.g., the onboard sensors 204). Routing can be done using vehicle location, distance to travel, queue in line for vehicle marshaling, etc. Vehicles 102 requiring additional charge/fuel can be prepped ahead of joining the queue. Other vehicles 102 destined to a particular waypoint operate in the same way, so that movement of an entire fleet can be coordinated. The movements of the entire fleet are coordinated through a central fleet-management system that directs all traffic and logistics from an assembly plant to the waypoint. For example, the entire fleet can be organized in a pre-sorted order.

The centralized fleet-management application in various examples has complete knowledge of the vehicles 102 in its control (for example, current location, destination, special notes, etc.), which adds accountability and traceability to the distribution process. The fleet-management is coordinated within and/or across sites to optimize delivery timing of each of the one or more vehicles 102a-102e to the waypoint. Several logistics applications can be used, which may involve a combination of an infrastructure system integrated with a traffic-management algorithm to queue and deconflict vehicles in real-time. Accordingly, the fleet-management application queues vehicles 102 based on unique characteristics (how far does a particular vehicle of the one or more vehicles 102a-102e need to travel, what traffic is along the route, when does the particular vehicle of the one or more vehicles 102a-102e need to get to a particular location to line up in the correct order, etc.).

Figure 3:
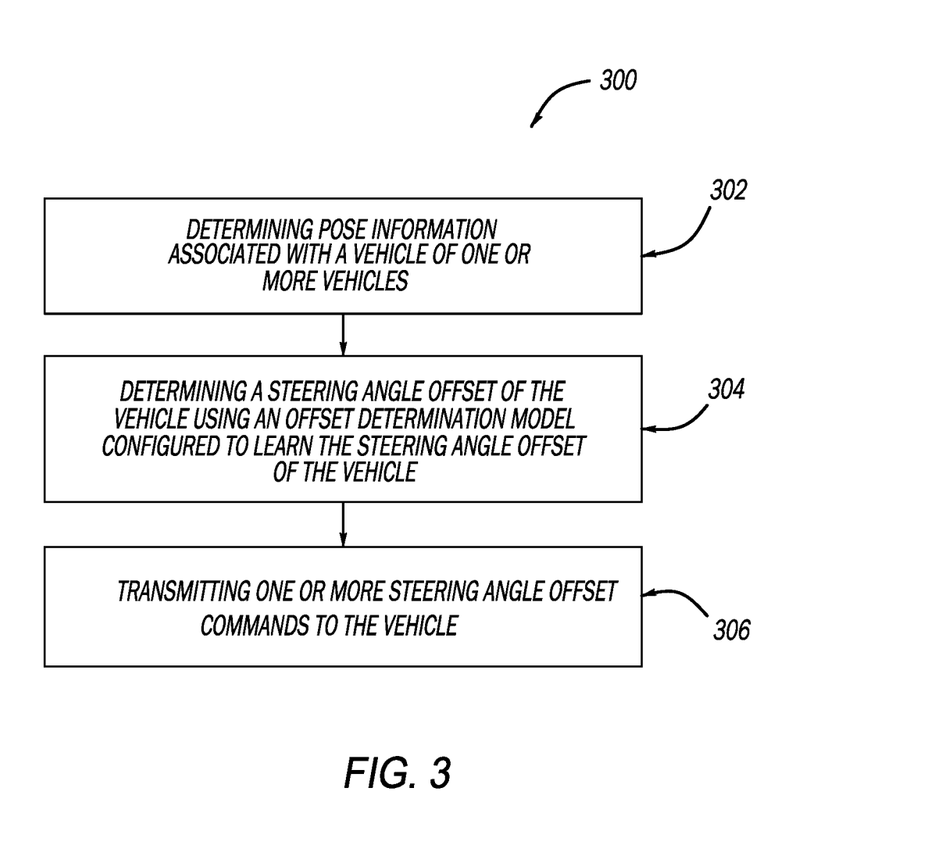
FIG. 3 is a flowchart illustrating an example method for calibrating a steering angle offset associated with a vehicle in accordance with various implementations.

FIG. 3 is a flowchart illustrating an example method 300 for calibrating a steering angle offset associated with a vehicle (e.g., a vehicle of the one or more vehicles 102a-102e) in accordance with various implementations. At operation 302, pose information associated with a vehicle of the one or more vehicles 102a-102e is determined. For example, the pose information is determined by an infrastructure system (e.g., the infrastructure system 104). The pose information includes an x-location, a y-location, a yaw angle, a velocity, or a combination thereof. In an embodiment, video data (e.g., AVI, MP4, MOV, etc.) related to the pose information is obtained. For example, the video data is obtained by one or more sensors (e.g., the sensors 108) associated with the infrastructure system 104.

At operation 304, a steering angle offset of the vehicle is determined using an offset determination model (e.g., the offset determination model 114). For example, the steering angle offset of the vehicle is determined by the infrastructure system 104. As another example, the offset determination model 114 is configured to learn the steering angle offset of the vehicle. As an additional example, the determination of the steering angle offset is based on the pose information. In an embodiment, an angular velocity of steering angle offset commands ($\dot{\theta}_{offset\ command}$) is calculated. For example, the $\dot{\theta}_{offset\ command}$ is calculated based on $\dot{\theta}_{command}^{offset}=k\times(\theta_{desired}-\theta_{observed})$ wherein the $\dot{\theta}_{offset\ command}$ is calculated by multiplying a learning rate (k) by a difference of a desired steering angle ($\theta_{desired}$) and an observed steering angle ($\theta_{observed}$).

At operation 306, one or more steering angle offset commands are transmitted to the vehicle. For example, the transmission of the one or more steering angle offset commands is made by the infrastructure system 104. As another example, the one or more steering angle offset commands include the learned steering angle offset, a desired angle, or a combination thereof. In an embodiment, one or more data points of the obtained video data are compared with an expected set of data points. In an instance wherein the comparison does not satisfy a defined condition, the video data is re-obtained. As an example, the determination of the steering angle offset is further based on a satisfaction of the defined condition. In another embodiment, one or more dynamic steering angle offsets associated with the vehicle are determined. For example, the one or more dynamic steering angle offset are determined based on data obtained at each location of a plurality of locations monitored by the infrastructure system 104. In yet another embodiment, an updated steering angle offset command is transmitted to the vehicle. For example, the updated steering angle offset command is based on aggregating the one or more dynamic steering angle offsets. As another example, the updated steering angle offset command includes the aggregated steering angle offset, the desired angle, or a combination thereof.

Figure 4:
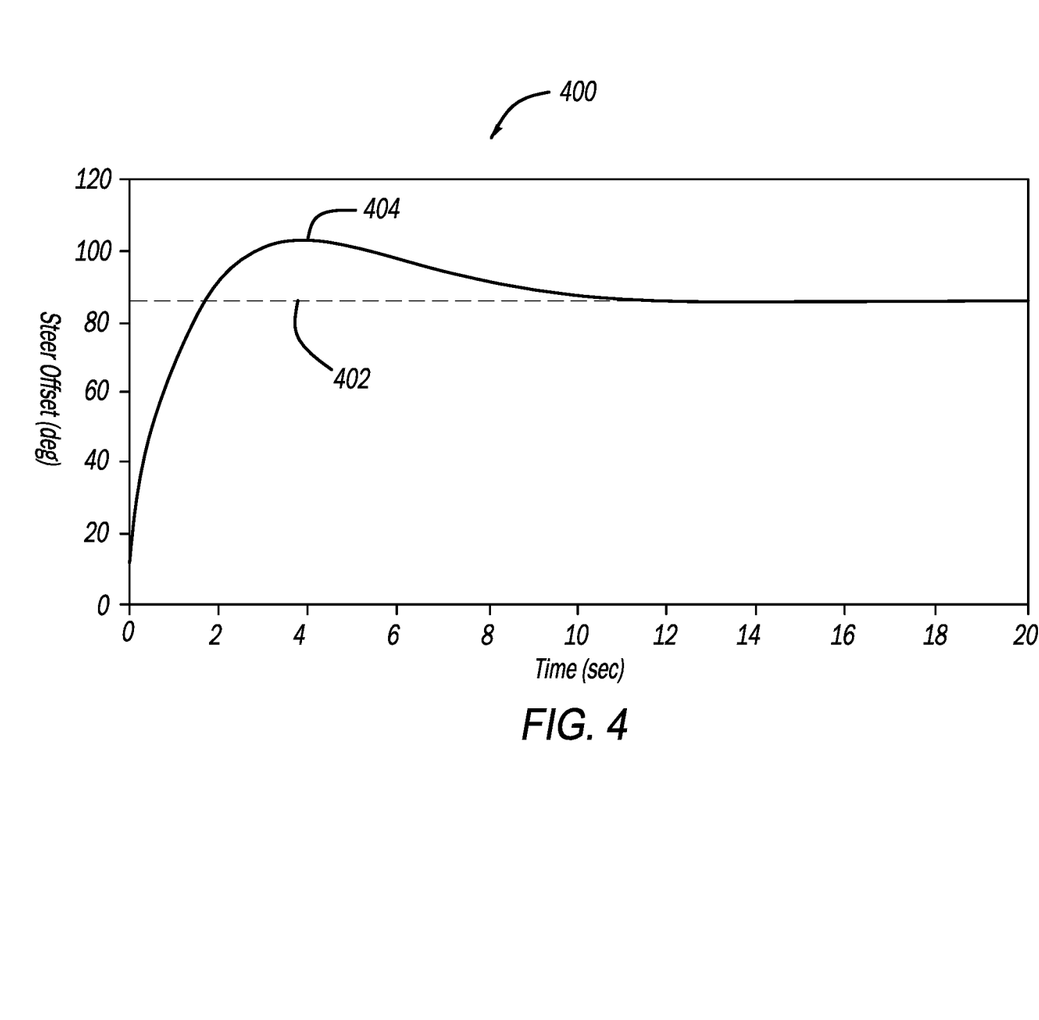
FIG. 4 is a graph depicting example results of a simulated steering angle offset determination in accordance with various implementations.

Referring to FIG. 4, a graph 400 is illustrative of a particular bias used to depict viability of a solution. For example, the solution is a real-time display of an adjustment made to the steering angle offset of a particular vehicle of the one or more vehicles 102a-102e. As another example, the solution is a simulated display of a potential adjustment that may be made to the steering angle offset of the particular vehicle of the one or more vehicles 102a-102e. As an additional example, the disclosure correspondent to the description of FIG. 3 provides a method for such a solution. The infrastructure system 104 provides a closed-loop controller (e.g., the infrastructure controller 112) that uses infrastructure-based pose estimate/information to detect and adjust for steering bias. For example, the particular bias depicted shows that a desired steering angle offset 402 is approximately 90 degrees. The hyperbolic reading 404 is a measurement of a current steering angle offset of the particular vehicle of the one or more vehicles 102a-102e. For example, the infrastructure system 104 is configured to determine the pose information associated with each vehicle of the one or more vehicles 102a-102e via the sensors 108. As another example, as the vehicles 102 enter a field of view of the sensors 108, the sensors 108 can obtain video data related to the pose information associated with each vehicle of the one or more vehicles 102a-102e. As another example, the pose information includes an x-location, a y-location, a yaw angle, a velocity, or a combination thereof.

The infrastructure controller 112 is configured to compare one or more data points of the obtained video data with an expected set of data points. For example, the expected set of data points are stored in a database (not shown). It is understood that the database may be internally disposed within the infrastructure system 104 and/or disposed externally relative to the infrastructure system 104. As an additional example, the expected set of data points include a desired x-location, a desired y-location, a desired yaw angle, a desired velocity, or a combination thereof. The infrastructure controller 112 is further configured to use data points associated with any of the x-location, the y-location, the yaw angle, and/or the velocity in order to make a comparison to the data points associated with the desired x-location, the desired y-location, the desired yaw angle, and/or the desired velocity, respectively. It is understood that the infrastructure controller 112 may use any one, or any combination, of the data points associated with any of the x-location, the y-location, the yaw angle, and/or the velocity in order to make a comparison with any one respective, or any respective combination, stored desired datapoint(s). It is further understood that the stored desired datapoints can be predefined and indicative of ideal or desired values that are associated with an ideal or desired steering angle offset. For example, the ideal or desired values may vary based on the specific type and/or model of the vehicle. As another example, while the ideal or desired steering angle offset may vary based on the specific type and/or model of the vehicle, it is generally understood that a closest-to-zero steering angle offset is preferred, in some implementations.

In the instance wherein the infrastructure controller 112 determines that the sensors 108 did not capture each of the required datapoints, the infrastructure controller 112 can cause the sensors 108 to reobtain (i.e., recapture) the video data based on the comparison not satisfying a condition. For example, the condition is whether the infrastructure controller 112 determines that the sensors 108 have captured each of the required datapoints to be able to make the comparison with the stored desired datapoints.

In the instance wherein the infrastructure controller 112 determines that the sensors 108 captured each of the required datapoints, the comparison is made to determine the steering angle offset between each of the required datapoints and the corresponding stored desired datapoints. In one or more examples, the measurement depicted by the hyperbolic reading 404 is a current steering angle offset relative to the desired steering angle offset 402. Based on the difference between the measurement depicted by the hyperbolic reading 404 and the desired steering angle offset 402, the infrastructure system 104 is configured to adjust the current steering angle offset of each vehicle of the one or more vehicles 102a-102e to match the desired steering angle offset.

The offset determination model 114 is configured to learn the steering angle offset based on the pose information. For example, the learned steering angle offset is illustrated by the measurement depicted by the hyperbolic reading 404. As another example, the steering angle offset is determined (i.e., learned) by calculating the $\dot{\theta}_{offset\ command}$. As another example, the $\dot{\theta}_{offset\ command}$ is calculated based on $\dot{\theta}_{command}{}^{offset}=k\times(\theta_{desired}-\theta_{observed})$. For example, the offset determination model 114 is also configured to calculate the $\dot{\theta}_{offset\ command}$ corresponding to each location of a plurality of locations (e.g., the dynamic steering angle offsets) monitored by the infrastructure system 104. As another example, the measurement depicted by the hyperbolic reading 404 can be representative of the dynamic steering angle offsets. As an additional example, the offset determination model 114 is also configured to learn the steering angle offset and/or the dynamic steering angle offsets of the vehicle based on the calculation of the $\dot{\theta}_{offset\ command}$.

Based on calculating the $\dot{\theta}_{offset\ command}$, the offset determination model 114 is configured to further determine the one or more steering offset commands, which is determined by calculating a steering angle command ($\theta_{command}$). For example, the $\theta_{command}$ is calculated based on $\theta_{command}=\theta_{offset\ command}+\theta_{desired}$, wherein the $\theta_{command}$ is calculated by adding a learned steering angle offset ($\theta_{offset\ command}$) to the $\theta_{desired}$. As a further example, the one or more steering offset commands are indicative of the $\theta_{command}$. In the instance wherein the dynamic steering angle offsets are represented by the measurement depicted by the hyperbolic reading 404, the $\dot{\theta}_{offset\ command}$ is calculated for each location of the plurality of locations. Based on the $\dot{\theta}_{offset\ command}$ associated with the dynamic steering angle offsets, the $\theta_{command}$ is calculated by aggregating the one or more dynamic steering angle offsets and then adding the aggregated steering angle offset to the $\theta_{desired}$. For example, the one or more updated steering offset commands are indicative of the $\theta_{command}$ determined based on the dynamic steering angle offsets.

Based on the $\theta_{offset\ command}$, the infrastructure system 104 is configured to cause the adjustment of the steering angle offset of each vehicle of the one or more vehicles 102a-102e by wirelessly communicating the one or more steering angle offset commands to each vehicle of the one or more vehicles 102a-102e. For example, the adjustment causes the measurement depicted by the hyperbolic reading 404 to match the angle indicated by the desired steering angle offset 402. As another example, the adjustment to the current steering angle offset can be made within a time period of any of the vehicles 102 exiting a last manufacturing workstation (e.g., a wheel assembly workstation) and traveling toward an end-of-line testing/configuration workstation. For example, while the time period may be within seconds of any of the vehicles 102 exiting the last manufacturing workstation, the time period may be any time at all.

Figure 5:
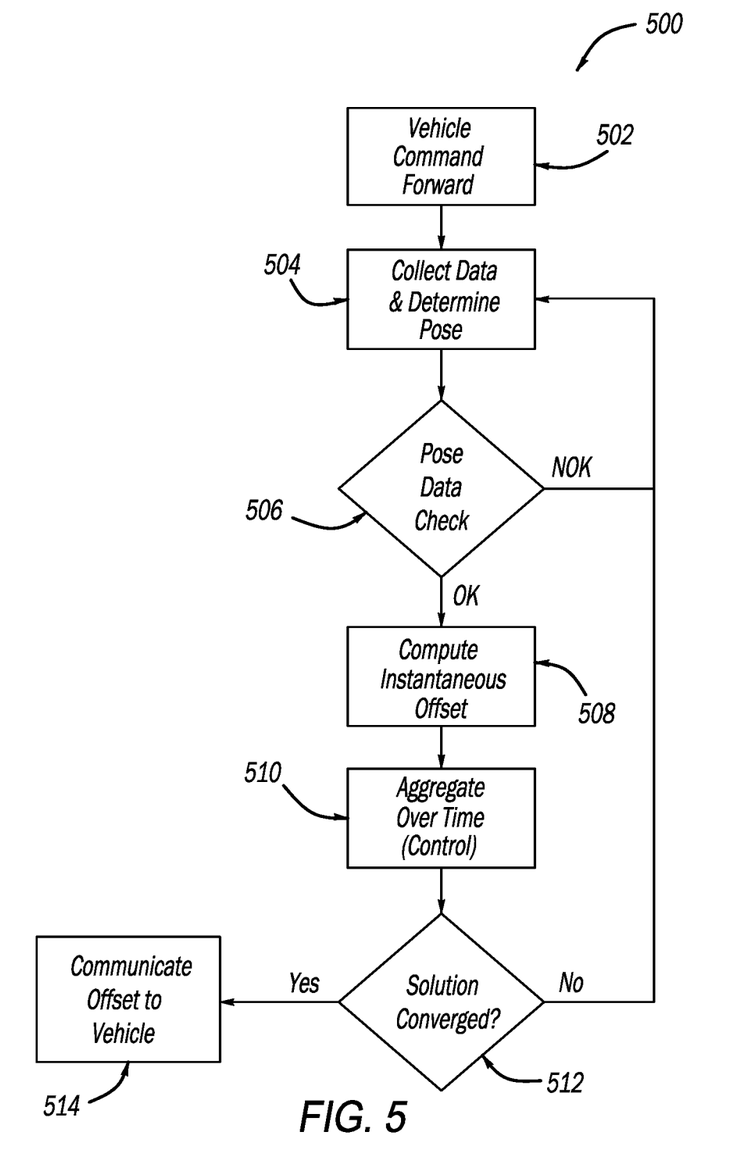
FIG. 5 is a flowchart illustrating another example method for calibrating a steering angle offset associated with a vehicle in accordance with various implementations.

FIG. 5 is a flowchart illustrating an example method 500 for calibrating the steering angle offset associated with a vehicle (e.g., a vehicle of the one or more vehicles 102a-102e) in accordance with various implementations. More specifically, the method 500 describes the determination and transmission of one or more updated steering offset commands associated with the dynamic steering angle offsets. It is understood that the vehicles 102 are marshaled by the infrastructure system 104. At operation 502, the infrastructure system 104 sends a command (e.g., via broadcast or unicast) to the vehicles 102. For example, the command can include instructions for a vehicle of the one or more vehicles 102a-102e, or any combination of the vehicles 102, to move forward.

At operation 504, pose information associated with a vehicle of one or more vehicles 102a-102e is obtained by the sensors 108. The sensors 108 obtain video data associated with the pose information of each of the vehicles 102 as the vehicles 102 travel through the field of view of the sensors 102. It is understood that the field of view of the sensors 108 can cover the entirety of the factory floor, for example. It is further understood that the video data associated with each of the vehicles 102 is obtained at a plurality of locations through the factory floor, for example. Data is obtained at each location of the plurality of locations monitored by the sensors 108. Also, at operation 502, pose information associated with a vehicle of the one or more vehicles 102a-102e is determined. For example, the determination of the pose information is based on the video data obtained by the sensors 108.

At operation 506, the obtained pose information associated with the vehicles 102 is compared to the expected set of data points. Based on whether the infrastructure controller 112 determines whether the sensors captured each of the required data points associated with any of the expected set of data points (e.g., the x-location, the y-location, the yaw angle, and or the velocity), the $\dot{\theta}_{offset\ command}$ may be calculated. For example, in the instance wherein the infrastructure controller 112 determines that the sensors 108 did not capture each of the required datapoints (e.g., not ok (NOK)), the infrastructure controller 112 can cause the sensors 108 to re-obtain (e.g., recapture the video data and re-determine the pose information at operation 504) the video data based on the comparison not satisfying the condition. It is understood that the condition, in some examples, is whether each of the required datapoints have been captured that will enable the infrastructure controller 112 to be able to make the comparison with the stored desired datapoints.

In the instance wherein the infrastructure controller 112 determines that the sensors 108 of the infrastructure system 104 did capture each of the required datapoints (e.g., OK), the comparison is made. At operation 508, the offset determination model 114 of the infrastructure controller 112 calculates the $\dot{\theta}_{offset\ command}$ corresponding to each location of the plurality of locations. At operation 510, the offset determination model 114 of the infrastructure controller 112 calculates the $\theta_{command}$ by aggregating the one or more dynamic steering angle offsets and then adding the aggregated steering angle offset to the $\theta_{desired}$. For example, the offset determination model 114 of the infrastructure controller 112 calculates the $\theta_{command}$ based on the $\dot{\theta}_{offset\ command}$.

At operation 512, based on the $\theta_{offset\ command}$, the offset determination model 114 attempts to converge the steering angle offset of each vehicle of the one or more vehicles 102a-102e to adjust to the angle of the desired steering angle offset 402. In the instance wherein the convergence of the steering angle offset of each vehicle of the one or more vehicles 102a-102e to adjust to the angle of the desired steering angle offset 402 is unsuccessful (e.g., NO), the infrastructure controller 112 can cause the sensors 108 to re-obtain (e.g., recapture the video data and re-determine the pose information at operation 504) the video data. From this point, once the sensors 108 are caused to re-obtain the video data, the operations 506-512 are repeated until the convergence of the steering angle offset of each vehicle of the one or more vehicles 102a-102e to adjust to the angle of the desired steering angle offset 402 is successful. At operation 514, the one or more steering angle offset commands are wirelessly sent to each vehicle of the one or more vehicles 102a-102e.

Thus one or more examples provide for the learning of a steering angle offset of a vehicle at the end-of-line of a manufacturing process so that any existing steering angle offset can be wirelessly reduced to an optimal steering angle offset.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:
   determining, by a processor of an infrastructure system, pose information associated with a vehicle of one or more vehicles;
   determining, by the processor of the infrastructure system, a steering angle offset of the vehicle using an offset determination model configured to learn the steering angle offset of the vehicle, wherein the determination of the steering angle offset is based on the pose information;
   determining, by the processor of the infrastructure system, whether one or more data points corresponding to the steering angle offset of the vehicle match one or more expected set of data points;
   transmitting, by the infrastructure system, one or more steering angle offset commands to the vehicle in response to determining that the one or more data points do not match the one or more expected set of data points, wherein the one or more steering angle offset commands include the learned steering angle offset, a desired angle, or a combination thereof; and
   causing, based on the one or more steering angle offset commands, the steering angle offset of the vehicle to be adjusted to a point wherein the one or more data points corresponding to the steering angle offset of the vehicle matches the one or more expected set of data points.

2. The method of claim 1, wherein the pose information includes an x-location, a y-location, a yaw angle, a velocity, or a combination thereof.

3. The method of claim 1, wherein determining the steering angle offset of the vehicle further comprises:
   calculating an angular velocity of steering angle offset commands ($\dot{\theta}_{offset\ command}$) based on:

$$\dot{\theta}_{command}{}^{offset} = k \times (\theta_{desired} - \theta_{observed}),$$

wherein the $\dot{\theta}_{offset\ command}$ is calculated by multiplying a learning rate (k) by a difference of a desired steering angle ($\theta_{desired}$) and an observed steering angle ($\theta_{observed}$).

4. The method of claim 1, wherein determining the pose information further comprises:
   obtaining, by one or more sensors associated with the infrastructure system, video data related to the pose information.

5. The method of claim 4, further comprising:
   comparing one or more data points of the obtained video data with an expected set of data points; and
   re-obtaining the video data based on the comparison not satisfying a defined condition.

6. The method of claim 5, wherein determining the steering angle offset is further based on the comparison satisfying the defined condition.

7. The method of claim 1, further comprising:
   determining one or more dynamic steering angle offsets associated with the vehicle based on data obtained at each location of a plurality of locations monitored by the infrastructure system; and transmitting an updated steering angle offset command to the vehicle, wherein the updated steering angle offset command is based on aggregating the one or more dynamic steering angle offsets and includes the aggregated steering angle offset, the desired angle, or a combination thereof.

8. A system comprising:
an infrastructure system configured to:
determine pose information associated with a vehicle of one or more vehicles,
determine a steering angle offset of the vehicle using an offset determination model configured to learn the steering angle offset of the vehicle, wherein the determination of the steering angle offset is based on the pose information,
determine whether one or more data points corresponding to the steering angle offset of the vehicle match one or more expected set of data points;
transmit one or more steering angle offset commands to the vehicle in response to determining that the one or more data points do not match the one or more expected set of data points, wherein the one or more steering angle offset commands include the learned steering angle offset, a desired angle, or a combination thereof; and
the vehicle configured to receive the one or more steering angle offset commands, and based on the one or more steering angle offset commands, adjust the steering angle offset of the vehicle to a point wherein the one or more data points corresponding to the steering angle offset of the vehicle matches the one or more expected set of data points.

9. The system of claim 8, wherein the pose information includes an x-location, a y-location, a yaw angle, a velocity, or a combination thereof.

10. The system of claim 8, wherein the infrastructure system configured to determine the steering angle offset of the vehicle is further configured to:
calculate an angular velocity of steering angle offset commands ($\dot{\theta}_{offset\ command}$) based on:

$$\dot{\theta}_{command}^{offset} = k \times (\theta_{desired} - \theta_{observed}),$$

wherein the $\dot{\theta}_{offset\ command}$ is calculated by multiplying a learning rate (k) by a difference of a desired steering angle ($\theta_{desired}$) and an observed steering angle ($\theta_{observed}$).

11. The system of claim 8, wherein the infrastructure system configured to determine the pose information is further configured to:
obtain, by one or more sensors associated with the infrastructure system,
video data related to the pose information.

12. The system of claim 11, wherein the infrastructure system is further configured to:
compare one or more data points of the obtained video data with an expected set of data points; and
re-obtain the video data based on the comparison not satisfying a defined condition.

13. The system of claim 12, wherein determining the steering angle offset is further based on the comparison satisfying the defined condition.

14. The system of claim 8, wherein the infrastructure system is further configured to:
determine one or more dynamic steering angle offsets associated with the vehicle based on data obtained at each location of a plurality of locations monitored by the infrastructure system; and transmit an updated steering angle offset command to the vehicle, wherein the updated steering angle offset command is based on aggregating the one or more dynamic steering angle offsets and includes the aggregated steering angle offset, the desired angle, or a combination thereof.

15. One or more non-transitory computer-readable media storing processor-executable instructions that, when executed by at least one processor, cause the at least one processor to:
determine, by an infrastructure system, pose information associated with a vehicle of one or more vehicles, wherein the pose information includes an x-location, a y-location, a yaw angle, a velocity, or a combination thereof;
determine, by the infrastructure system, a steering angle offset of the vehicle using an offset determination model configured to learn the steering angle offset of the vehicle, wherein the determination of the steering angle offset is based on the pose information;
determine, by the infrastructure system, whether one or more data points corresponding to the steering angle offset of the vehicle match one or more expected set of data points;
transmit, by the infrastructure system, one or more steering angle offset commands to the vehicle in response to determining that the one or more data points do not match the one or more expected set of data points, wherein the one or more steering angle offset commands include the learned steering angle offset, a desired angle, or a combination thereof; and
cause, based on the one or more steering angle offset commands, the steering angle offset of the vehicle to be adjusted to a point wherein the one or more data points corresponding to the steering angle offset of the vehicle matches the one or more expected set of data points.

16. The one or more non-transitory computer-readable media of claim 15, wherein the processor-executable instructions that, when executed by the at least one processor, cause the infrastructure system to determine the steering angle offset of the vehicle, further cause the at least one processor to:
calculate an angular velocity of steering angle offset commands ($\dot{\theta}_{offset\ command}$) based on:

$$\dot{\theta}_{command}^{offset} = k \times (\theta_{desired} - \theta_{observed}),$$

wherein the $\dot{\theta}_{offset\ command}$ is calculated by multiplying a learning rate (k) by a difference of a desired steering angle ($\theta_{desired}$) and an observed steering angle ($\theta_{observed}$).

17. The one or more non-transitory computer-readable media of claim 15, wherein the processor-executable instructions that, when executed by the at least one processor, cause the infrastructure system to determine the pose information, further cause the at least one processor to:
obtain, by one or more sensors associated with the infrastructure system, video data related to the pose information.

18. The one or more non-transitory computer-readable media of claim 17, wherein the at least one processor is further caused to:
compare one or more data points of the obtained video data with an expected set of data points; and
re-obtain the video data based on the comparison not satisfying a defined condition.

19. The one or more non-transitory computer-readable media of claim 18, wherein determining the steering angle offset is further based on the comparison satisfying the defined condition.

20. The one or more non-transitory computer-readable media of claim 15, wherein the at least one processor is further caused to:
- determine one or more dynamic steering angle offsets associated with the vehicle based on data obtained at each location of a plurality of locations monitored by the infrastructure system; and
- transmit an updated steering angle offset command to the vehicle, wherein the updated steering angle offset command is based on aggregating the one or more dynamic steering angle offsets and includes the aggregated steering angle offset, the desired angle, or a combination thereof.

* * * * *